US007283522B2

(12) United States Patent
Siddabathuni

(10) Patent No.: US 7,283,522 B2
(45) Date of Patent: Oct. 16, 2007

(54) METHOD AND APPARATUS FOR OFFLOADING MESSAGE SEGMENTATION TO A NETWORK INTERFACE CARD

(75) Inventor: Ajoy C. Siddabathuni, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1094 days.

(21) Appl. No.: 10/256,611

(22) Filed: Sep. 27, 2002

(65) Prior Publication Data

US 2004/0062275 A1  Apr. 1, 2004

(51) Int. Cl.
*H04L 12/56* (2006.01)
(52) U.S. Cl. .................. 370/389; 370/471; 370/473; 370/474; 370/475; 370/476
(58) Field of Classification Search .............. 370/389, 370/471, 473, 474, 475, 476
See application file for complete search history.

(56) References Cited

U.S. PATENT DOCUMENTS 5,937,169 A * 8/1999 Connery et al. ............ 709/250
7,035,291 B2 * 4/2006 Grinfeld ..................... 370/503
2002/0163888 A1 * 11/2002 Grinfeld ..................... 370/235
2003/0002497 A1 * 1/2003 Vasudevan .................. 370/389
2003/0172342 A1 * 9/2003 Elzur ......................... 714/776

* cited by examiner

*Primary Examiner*—Hassan Kizou
*Assistant Examiner*—Jay P. Patel
(74) *Attorney, Agent, or Firm*—Park, Vaughan & Fleming LLP

(57) ABSTRACT

One embodiment of the present invention provides a system that facilitates offloading message segmentation from a central processing unit onto a network interface card. The system operates by first receiving a TSO-send message at the network interface card, wherein the TSO-send message contains information about the message to be sent. Next, the system uses a header address from the TSO-send message to access a message header from memory using remote direct memory access. The system then uses a payload address from the TSO-send message to access a payload from memory that contains message data using remote direct memory access. Finally, the network interface card segments the payload into a set of maximum segment size (mss) segments and transmits the set of mss segments on the network.

24 Claims, 5 Drawing Sheets

US 7,283,522 B2

METHOD AND APPARATUS FOR OFFLOADING MESSAGE SEGMENTATION TO A NETWORK INTERFACE CARD

BACKGROUND

1. Field of the Invention

The present invention relates to the process of transmitting data across a computer network. More specifically, the present invention relates to a method and an apparatus for offloading the task of message segmentation from a central processing unit to a network interface card 2. Related Art Modern communication protocols allow applications executing on different computer systems to communicate with each other. Typically, an application desiring to communicate with another application on another computer system passes the message to a communication process associated with a protocol stack. This protocol stack provides many different mechanisms to transport messages between applications. For example, the Transmission Control Protocol/Internet Protocol (TCP/IP) stack provides reliable delivery of messages from one application to another.

Typically, the TCP layer on the sending end segments a message into maximum segment size (mss) units and transmits the segments to the TCP layer on the receiving end. The TCP layer on the receiving end ensures that each segment is reliably received and that the segments are in proper order.

The IP layer, which operates under the TCP layer, passes these segments from the TCP layer on the sending end to a counterpart IP layer on the receiving end. The IP layer supports addressing that allows segments to be delivered to the proper receiver. However, the IP layer is not reliable. Segments may be lost in transit over the physical network, or the segments may be delivered out of order.

A physical layer resides under the IP layer and typically includes an Ethernet interface. The Ethernet interface facilitates addressing for the sending and receiving ends of the physical link. In doing so, an address resolution protocol (ARP) associates the IP address to a corresponding Ethernet address.

Note that the maximum transmission unit (mtu) for the physical layer limits the mss. The mtu for Ethernet, for example, is 1500 octets (eight-bit bytes). Unfortunately, the relatively small mss allowed by this mtu can cause a performance bottleneck for high-bandwidth communications over modem high-speed networks. This is because performing the segmentation at the central processing unit (CPU) of a computer system causes the CPU to spend considerable time segmenting the messages, which can significantly limit the availability of the CPU to perform mainstream processing.

What is needed is a method and an apparatus for offloading the segmentation process from the CPU, thereby freeing the CPU to do productive work.

SUMMARY

One embodiment of the present invention provides a system that facilitates offloading message segmentation from a central processing unit onto a network interface card. The system operates by first receiving a TCP segmentation offload send (TSO-send) message packet at the network interface card, wherein the TSO-send message contains information about the message to be sent. Next, the system uses a header address from the TSO-send message to access a message header from memory using remote direct memory access. The system then uses a payload address from the TSO-send message to access a payload from memory that contains message data using remote direct memory access. Finally, the network interface card segments the payload into a set of maximum segment size (mss) segments and transmits the set of mss segments on the network.

In one embodiment of the present invention, the TSO-send message includes a maximum segment size that has been negotiated by a Transmission Control Protocol (TCP) stack.

In one embodiment of the present invention, segmenting the payload involves updating Internet Protocol (IP) parameters and Transmission Control Protocol (TCP) parameters for each segment.

In one embodiment of the present invention, the TSO-send message includes a data length for the payload.

In one embodiment of the present invention, if a last segment of the payload is less than a specified minimum size, the method further comprises padding the last segment with bytes until it is at least the specified minimum size.

In one embodiment of the present invention, the system processes a segment acknowledge message for each segment.

In one embodiment of the present invention, the system sends an acknowledge message to a Transmission Control Protocol (TCP) stack that originated the TSO-send message after receiving the segment acknowledge message for each segment.

In one embodiment of the present invention, the message header includes an Ethernet header, an Internet Protocol (IP) header, and a Transmission Control Protocol (TCP) header for a message.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
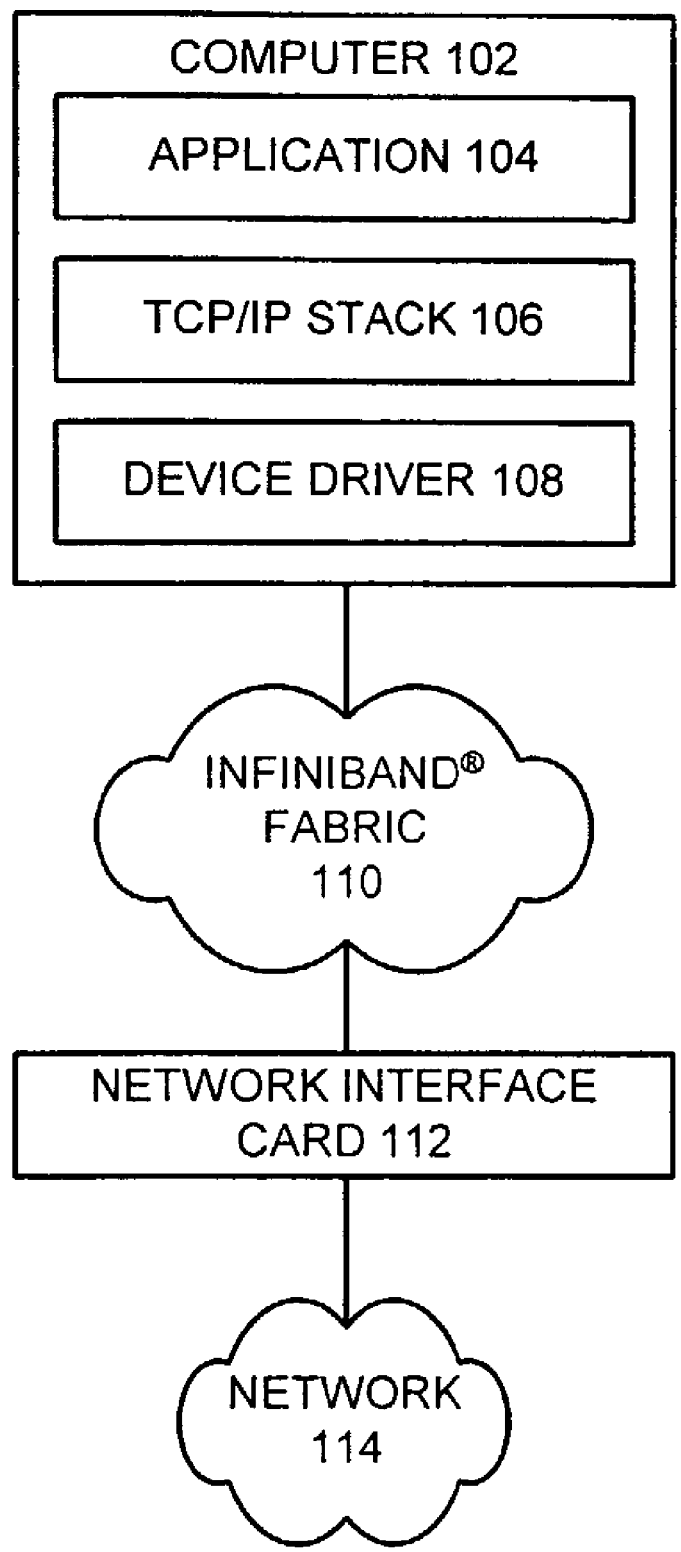
FIG. 1 illustrates computer 102 coupled to network interface card 112 in accordance with an embodiment of the present invention.

FIG. 1 illustrates computer 102 coupled to network interface card 112 in accordance with an embodiment of the present invention. Computer 102 is coupled to network interface card 112 by Infiniband® fabric 110. Infiniband® is a registered trademark of the Infiniband Trade Association. The Infiniband® fabric is known in the art and will not be described further herein.

Network interface card 112 is coupled to other computers through network 114. Network 114 can generally include any type of wire or wireless communication channel capable of coupling together computing nodes. This includes, but is not limited to, a local area network, a wide area network, or a combination of networks. In one embodiment of the present invention, network 114 includes the Internet.

Computer 102 includes application 104, TCP/IP stack 106, and device driver 108. Application 104 can generally be any application executing on computer 102 that needs to communicate with another application executing on another computer. During operation, application 104 passes messages to TCP/IP stack 106 for delivery to another application executing on another computer system.

TCP/IP stacks are known in the art, so only the differences of TCP/IP stack 106 from a typical TCP/IP stack will be discussed herein. TCP/IP stack 106 negotiates a maximum segment size (mss) with its counterpart TCP/IP stack on a second computer. However, rather than segment the message into mss sized segments, TCP/IP stack 106 passes a TSO-send message to device driver 108, which includes, inter alia, an address of a TCP/IP header, an address of a message data block, and the negotiated mss. The TCP/IP header and the message data block, which are located at the addresses specified in the TSO-send message include the whole message in one large segment.

Device driver 108 communicates with network interface card 112 across Infiniband® fabric 110 to deliver the TSO-send message to network interface card 112. Network interface card 112 then segments the message and sends it to the remote computer across network 114, thereby relieving the central processing unit in computer 102 of the necessity of segmenting the message.

Segmenting a Message

Figure 2:
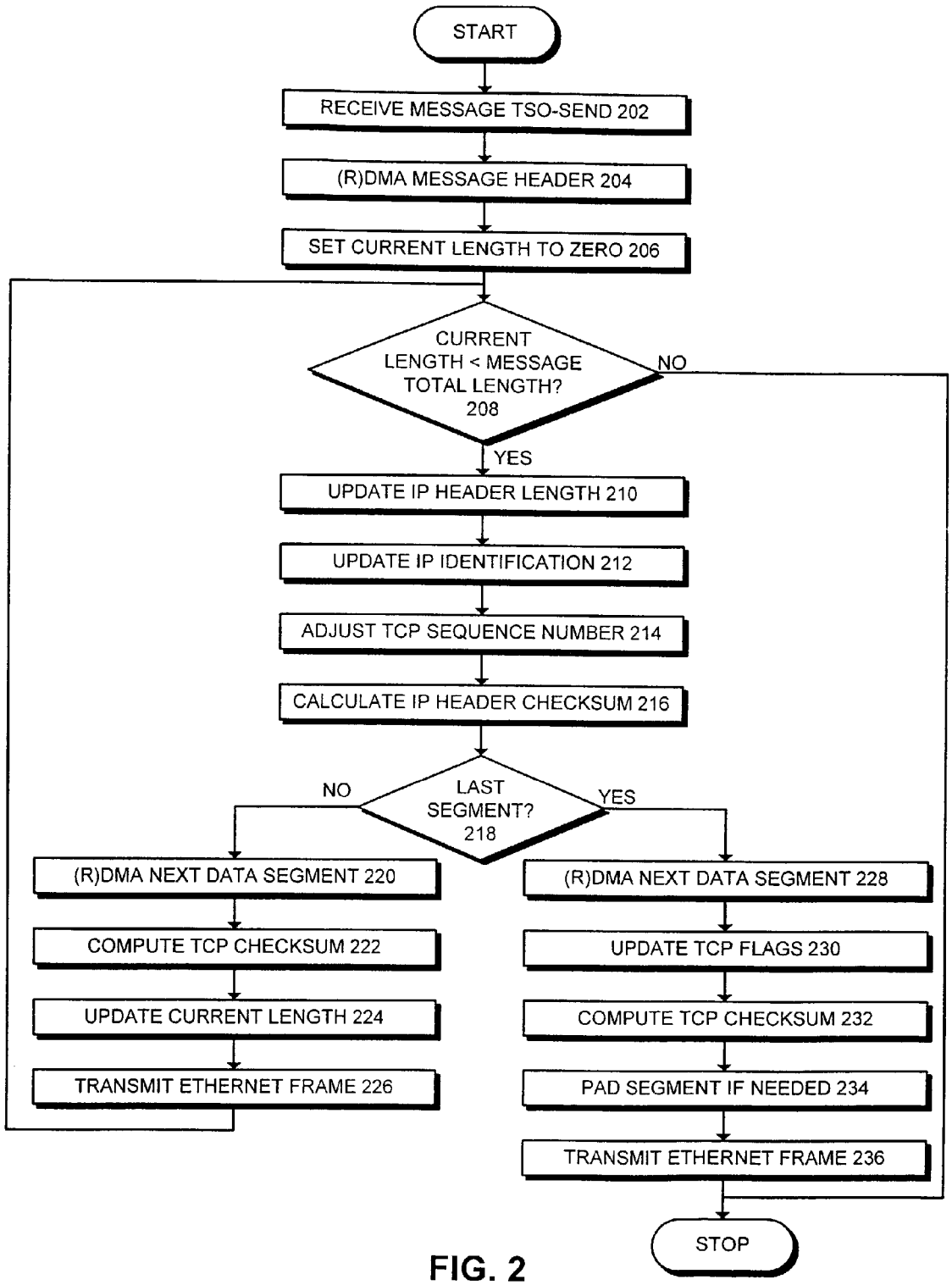
FIG. 2 is a flowchart illustrating the process of segmenting a message into maximum segment size units in accordance with an embodiment of the present invention.

FIG. 2 is a flowchart illustrating the process of segmenting a message into maximum segment size units in accordance with an embodiment of the present invention. The system starts when network interface card 112 receives a message TSO-send (step 202). Next, network interface card 112 accesses the message header using remote direct memory access (RDMA) across Infiniband® fabric 110 from the address specified in the TSO-send message (step 204). Network interface card 112 then sets an internal current length counter to zero in preparation for segmenting the message (step 206).

Network interface card 112 then enters a loop to segment the message into mss-sized segments. First network interface card 112 determines if the current length is less than the message total length (step 208). When this condition is no longer true, the process is terminated. If the condition is true, network interface card 112 updates the IP header length to match the length of the segmented datagram (step 210). Next, network interface card 112 increments the IP identification field so the received message can be reordered correctly at the receiving computer (step 212). Network interface card 112 then adjusts the TCP sequence number to indicate the first octet number for this segment (step 214). The IP header checksum is then calculated for the current information (step 216).

Network interface card 112 then determines if this is the last segment by comparing the data remaining to be sent with the amount of data that can be placed in the current segment (step 218). If this is not the last segment, network interface card 112 accesses the next data segment using RDMA across Infiniband® fabric 110 (step 220). Note that the starting address of the data segment is received in the TSO-send message. Next, network interface card 112 computes the TCP checksum for the current segment (step 222) and updates the current length counter (step 224). After updating the current length counter, network interface card 112 transmits the segment to the second computer across network 114 (step 226). The process then returns to step 208 to continue processing the message.

If the current segment is the last segment at step 218, network interface card 112 accesses the next data segment using RDMA across Infiniband® fabric 110 (step 228). Next, network interface card 112 updates the TCP flags to indicate that this is the last segment (step 230). Network interface card 112 then computes the TCP checksum (step 232). If necessary, network interface card 112 pads the segment to the minimum allowed length on the network (step 234). Finally, network interface card 112 transmits the segment to the second computer across network 114 (step 236).

Network Interface Card 112

Figure 3:
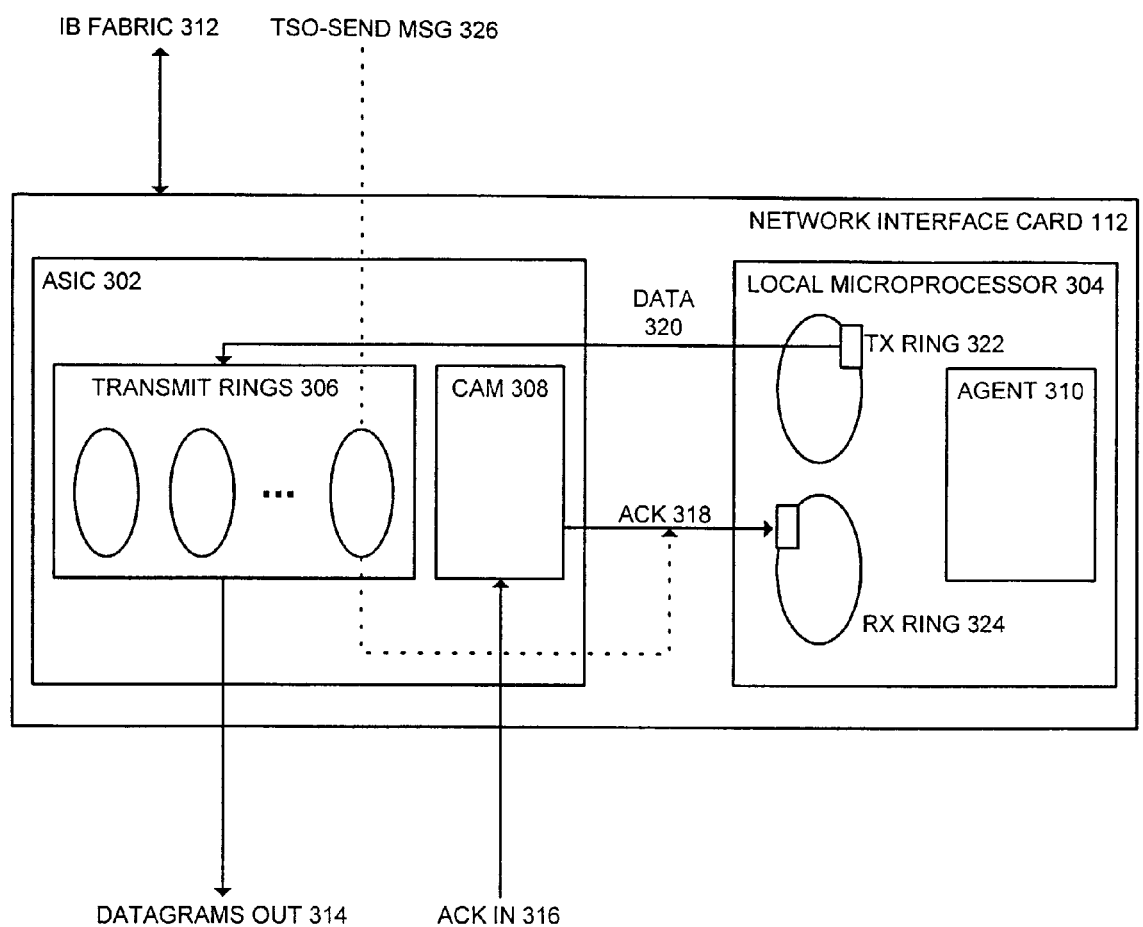
FIG. 3 illustrates network interface card 112 in accordance with an embodiment of the present invention.

FIG. 3 illustrates network interface card 112 in accordance with an embodiment of the present invention. This embodiment includes an acknowledge (ACK) mechanism, which processes ACK messages and notifies TCP/IP stack 106 in computer 102 when the total message has been delivered. Network interface card 112 includes Application-Specific Integrated Circuit (ASIC) 302 and local microprocessor 304. ASIC 302 includes transmit rings 306 and content addressable memory (CAM) 308, while local microprocessor 304 includes agent 310, receive (RX) ring 324, and transmit (TX) ring 322. Note that agent 310 is a software process and RX ring 324 and TX ring 322 are software data structures.

When TSO-send msg 326 arrives from device driver 108 in computer 102, ASIC 302 inspects TSO-send msg 326 to determine if the ACK mode bit is set. If so, an entry is made in CAM 308 and TSO-send msg 326 is routed to RX ring 324 within local microprocessor 304. Agent 310 then accesses the headers and data across Infiniband® fabric 312 as described above. Next, agent 310 places the first n (typically two) segments onto TX ring 322. These segments are routed as data 320 to transmit rings 306 and are placed on network 114 as datagrams out 314.

At some later time, a message arrives at ACK in 316 acknowledging the datagrams, which were previously sent. Note that the ACK may be included in the header of any arriving message. If the ACK message matches an entry in CAM 308, the header of the arriving message is sent as ACK 318 to RX ring 324. Agent 310 then matches the ACK with segments already sent and schedules the next segment to be sent. Agent 310 also resends any segments that have not received an ACK after a specified period of time. After an ACK has been received for each segment indicating that all segments have been delivered, agent 310 sends an ACK to the CPU indicating the message has been delivered.

Acknowledgement Processing

Figure 4:
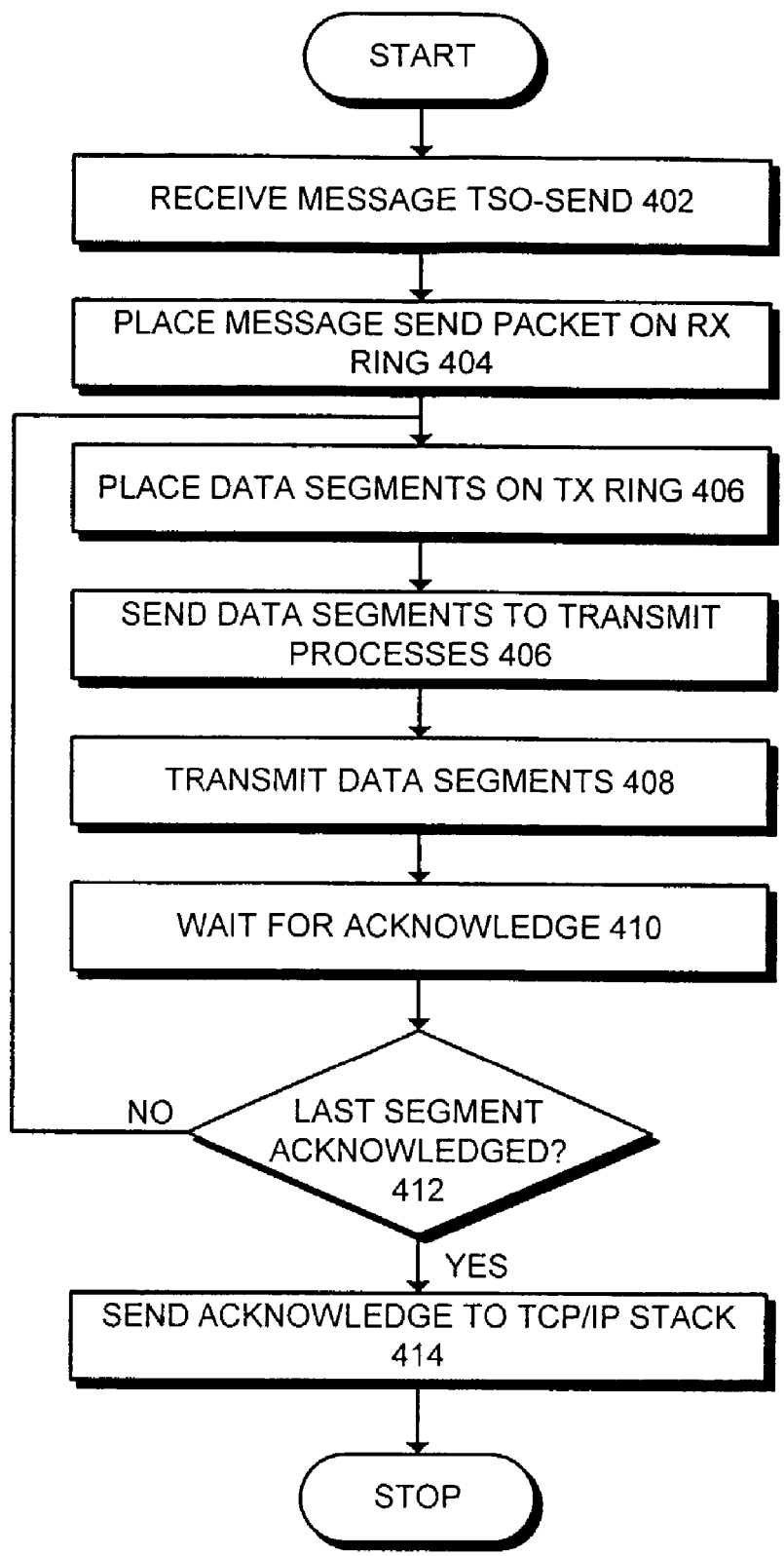
FIG. 4 is a flowchart illustrating processing of acknowledgements in accordance with an embodiment of the present invention.

FIG. 4 is a flowchart illustrating processing of acknowledgements in accordance with an embodiment of the present invention. The system starts when network interface card 112 receives a message TSO-send (step 402). Network interface card 112 places this TSO-send message on RX ring 324 (step 404). Agent 310 within local microprocessor 304 segments the message for transmission as described above and places the first n (typically two) segments on TX ring 322 for delivery (step 406).

The segments that are placed on TX ring 322 are sent to transmit rings 306 for delivery to a second computer (step 406). ASIC 302 then transmit the segments as datagrams out 314 (step 408). After the segments have been transmitted, agent 310 waits for an ACK message acknowledging receipt of the segments (step 410).

After receiving an ACK for a segment, agent 310 determines if all segments have been sent and acknowledged (step 412). If not, the process returns to step 406 to send the next segment or resend an unacknowledged segment. Otherwise, agent 310 sends an ACK message to TCP/IP stack 106 to acknowledge delivery of the message thereby terminating the process (step 414).

Header Formats

Figure 5:
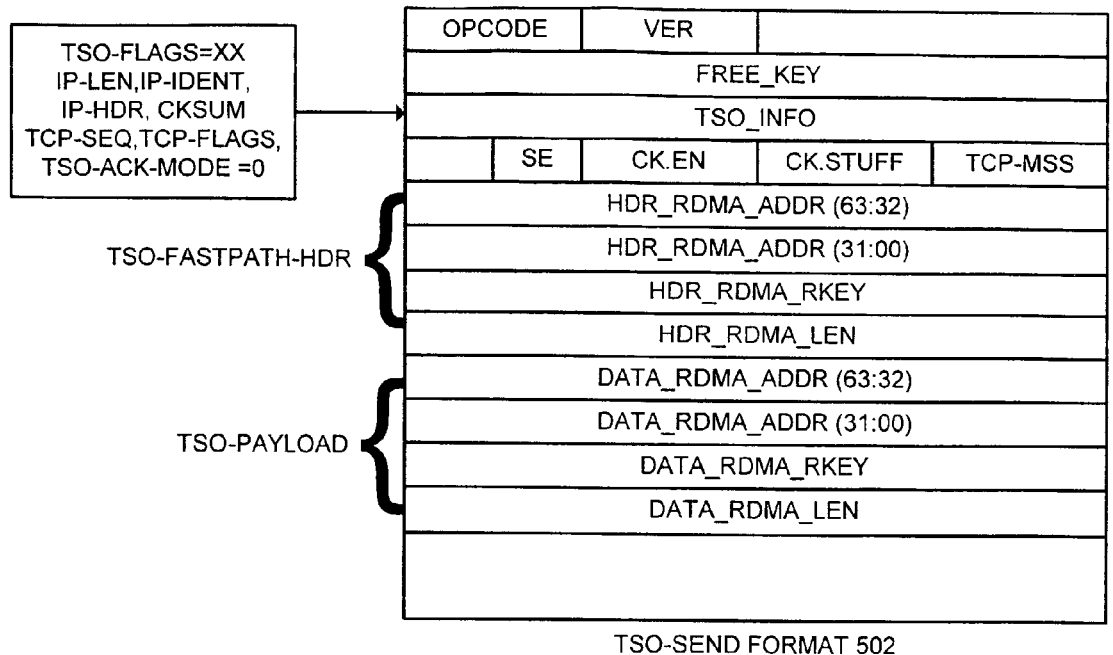
FIG. 5 illustrates TSO-send format 502 in accordance with an embodiment of the present invention.

FIG. 5 illustrates TSO-send format 502 in accordance with an embodiment of the present invention. TSO-send format 502 provides information to network interface card 112 to allow transmission of the data to take place. TSO-send format 502 includes a HDR_RDMA_ADDR, a HDR_RDMA_RKEY, and a HDR_RDMA_LEN so that network interface card 112 can download the original header for the transmission. Additionally, TSO-send format 502 includes a DATA_RDMA_ADDR, a DATA_RDMA_RKEY, and a DATA_RDMA_LEN for locating and downloading the message data.

Figure 6:
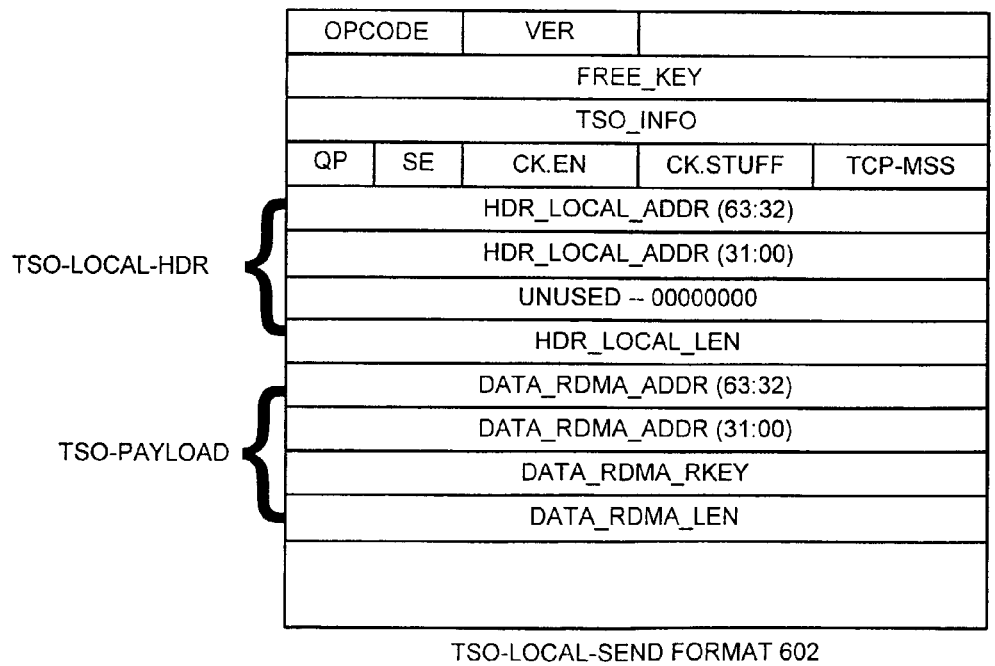
FIG. 6 illustrates TSO-local-send format 602 in accordance with an embodiment of the present invention.

FIG. 6 illustrates TSO-local-send format 602 in accordance with an embodiment of the present invention. During download, network interface card 112 generates TSO-local-send format 602 to provide data for individual TCP packets on the network. TSO-local-send format 602 includes a HDR_LOCAL_ADDR and a HDR_LOCAL_LEN for tracking the headers of the network packets. Additionally, TSO-local-send format 602 includes a DATA_RDMA_ADDR, a DATA_RDMA_RKEY, and a DATA_RDMA_LEN for tracking where the current packet is in the data.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for offloading message segmentation from a central processing unit to a network interface card, comprising:

receiving a Message send packet at the network interface card from the central processing unit, wherein the Message send packet contains information about a message to be sent, and wherein the information about the message to be sent includes an address to a message header, an address to a message data block to be transmitted, and a maximum segment size;

using the header address from the Message send packet to access the message header from memory using remote direct memory access;

using the address to the message data block from the Message send packet to access a payload containing message data from memory using remote direct memory access;

segmenting the payload into a set of maximum segment size segments; and transmitting the payload on a network by transmitting the set of maximum segment size segments.

2. The method of claim 1, wherein the Message send packet includes a maximum segment size that has been negotiated by a Transmission Control Protocol (TCP) stack.

3. The method of claim 1, wherein segmenting the payload involves updating Internet Protocol (IP) parameters and Transmission Control Protocol (TCP) parameters for each segment.

4. The method of claim 1, wherein the Message send packet includes a data length for the payload.

5. The method of claim 1, wherein if a last segment of the payload is less than a specified minimum size, the method further comprises padding the last segment with bytes until it is at least the specified minimum size.

6. The method of claim 1, further comprising processing a segment acknowledge message for each segment.

7. The method of claim 6, further comprising sending an acknowledge message to a Transmission Control Protocol (TCP) stack that originated the Message send packet after receiving the segment acknowledge message for each segment.

8. The method of claim 1, wherein the message header includes an Ethernet header, an Internet Protocol (IP) header, and a Transmission Control Protocol (TCP) header for the message.

9. A computer-readable storage medium storing instructions that when executed by a computer cause the computer to perform a method for offloading message segmentation from a central processing unit to a network interface card, the method comprising:

receiving a Message send packet at the network interface card from the central processing unit, wherein the Message send packet contains information about a message to be sent, and wherein the information about the message to be sent includes an address to a message header, an address to a message data block to be transmitted, and a maximum segment size;

using the header address from the Message send packet to access the message header from memory using remote direct memory access;

using the address to the message data block from the Message send packet to access a payload containing message data from memory using remote direct memory access;

segmenting the payload into a set of maximum segment size segments; and transmitting the payload on a network by transmitting the set of maximum segment size segments.

10. The computer-readable storage medium of claim 9, wherein the Message send packet includes a maximum segment size that has been negotiated by a Transmission Control Protocol (TCP) stack.

11. The computer-readable storage medium of claim 9, wherein segmenting the payload involves updating Internet Protocol (IP) parameters and Transmission Control Protocol (TCP) parameters for each segment.

12. The computer-readable storage medium of claim 9, wherein the Message send packet includes a data length for the payload.

13. The computer-readable storage medium of claim 9, wherein if a last segment of the payload is less than a specified minimum size, the method further comprises padding the last segment with bytes until it is at least the specified minimum size.

14. The computer-readable storage medium of claim 9, the method further comprising processing a segment acknowledge message for each segment.

15. The computer-readable storage medium of claim 14, the method further comprising sending an acknowledge message to a Transmission Control Protocol (TCP) stack that originated the Message send packet after receiving the segment acknowledge message for each segment.

16. The computer-readable storage medium of claim 9, wherein the message header includes an Ethernet header, an Internet Protocol (IP) header, and a Transmission Control Protocol (TCP) header for the message.

17. An apparatus for offloading message segmentation from a central processing unit to a network interface card, comprising:
   a receiving mechanism that is configured to receive a Message send packet at the network interface card from the central processing unit, wherein the Message send packet contains information about a message to be sent, and wherein the information about the message to be sent includes an address to a message header, an address to a message data block to be transmitted, and a maximum segment size;
   an accessing mechanism that is configured to use the header address from the Message send packet to access the message header from memory using remote direct memory access;
   wherein the accessing mechanism is further configured to use address to the message data block from the Message send packet to access a payload containing message data from memory using remote direct memory access;
   a segmenting mechanism that is configured to segment the payload into a set of maximum segment size segments; and
   a transmitting mechanism that is configured to transmit the payload on a network by transmitting the set of maximum segment size segments.

18. The apparatus of claim 17, wherein the Message send packet includes a maximum segment size that has been negotiated by a Transmission Control Protocol (TCP) stack.

19. The apparatus of claim 17, wherein the segmenting mechanism is further configured to update Internet Protocol (IP) parameters and Transmission Control Protocol (TCP) parameters for each segment.

20. The apparatus of claim 17, wherein the Message send packet includes a data length for the payload.

21. The apparatus of claim 17, further comprising a padding mechanism that is configured to pad a last segment with bytes until it is at least a specified minimum size.

22. The apparatus of claim 17, further comprising a processing mechanism that is configured to process a segment acknowledge message for each segment.

23. The apparatus of claim 22, further comprising a sending mechanism that is configured to send an acknowledge message to a Transmission Control Protocol (TCP) stack that originated the Message send packet after receiving the segment acknowledge message for each segment.

24. The apparatus of claim 17, wherein the message header includes an Ethernet header, an Internet Protocol (IP) header, and a Transmission Control Protocol (TCP) header for the message.

* * * * *